May 18, 1943.  M. A. CROSBY  2,319,444
REMOTE INDICATOR FOR DISPENSING PUMPS
Filed Jan. 23, 1940  4 Sheets-Sheet 1

Inventor
MELVIN A. CROSBY
by Toulmin & Toulmin
Attorneys

May 18, 1943  M. A. CROSBY  2,319,444
REMOTE INDICATOR FOR DISPENSING PUMPS
Filed Jan. 23, 1940  4 Sheets-Sheet 2
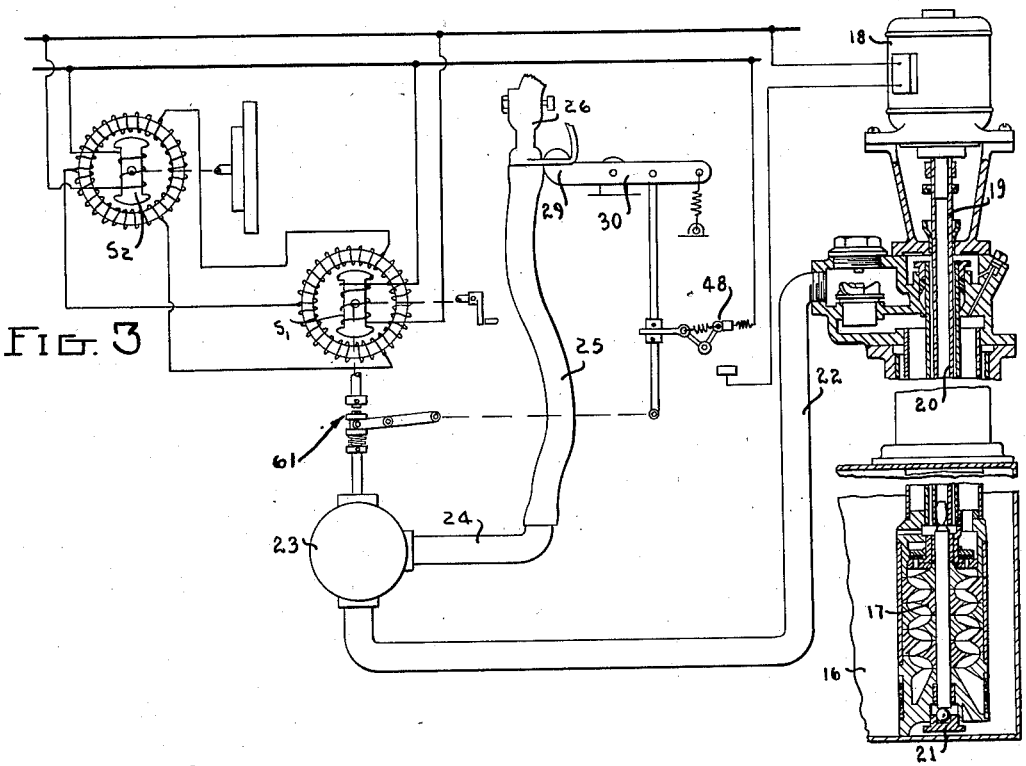
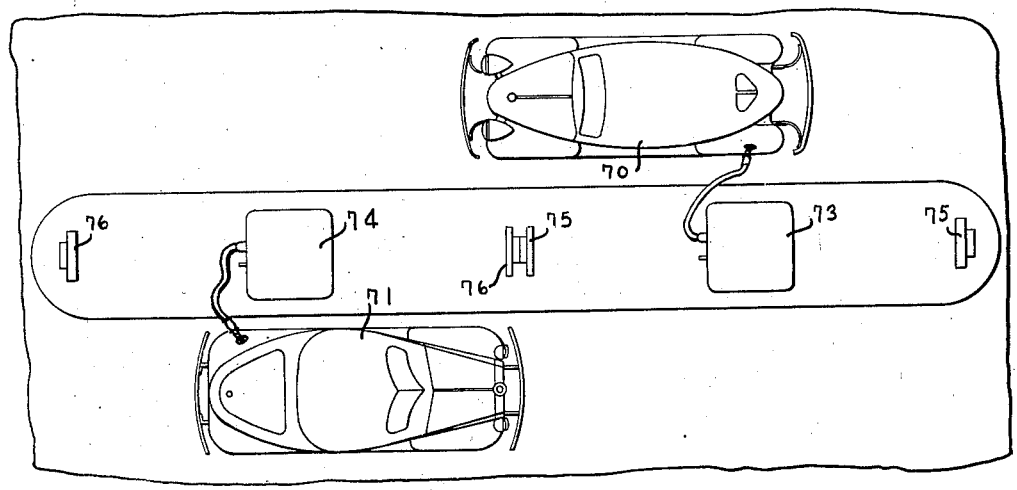
Inventor
MELVIN A. CROSBY
by Poulmin & Poulmin
Attorneys

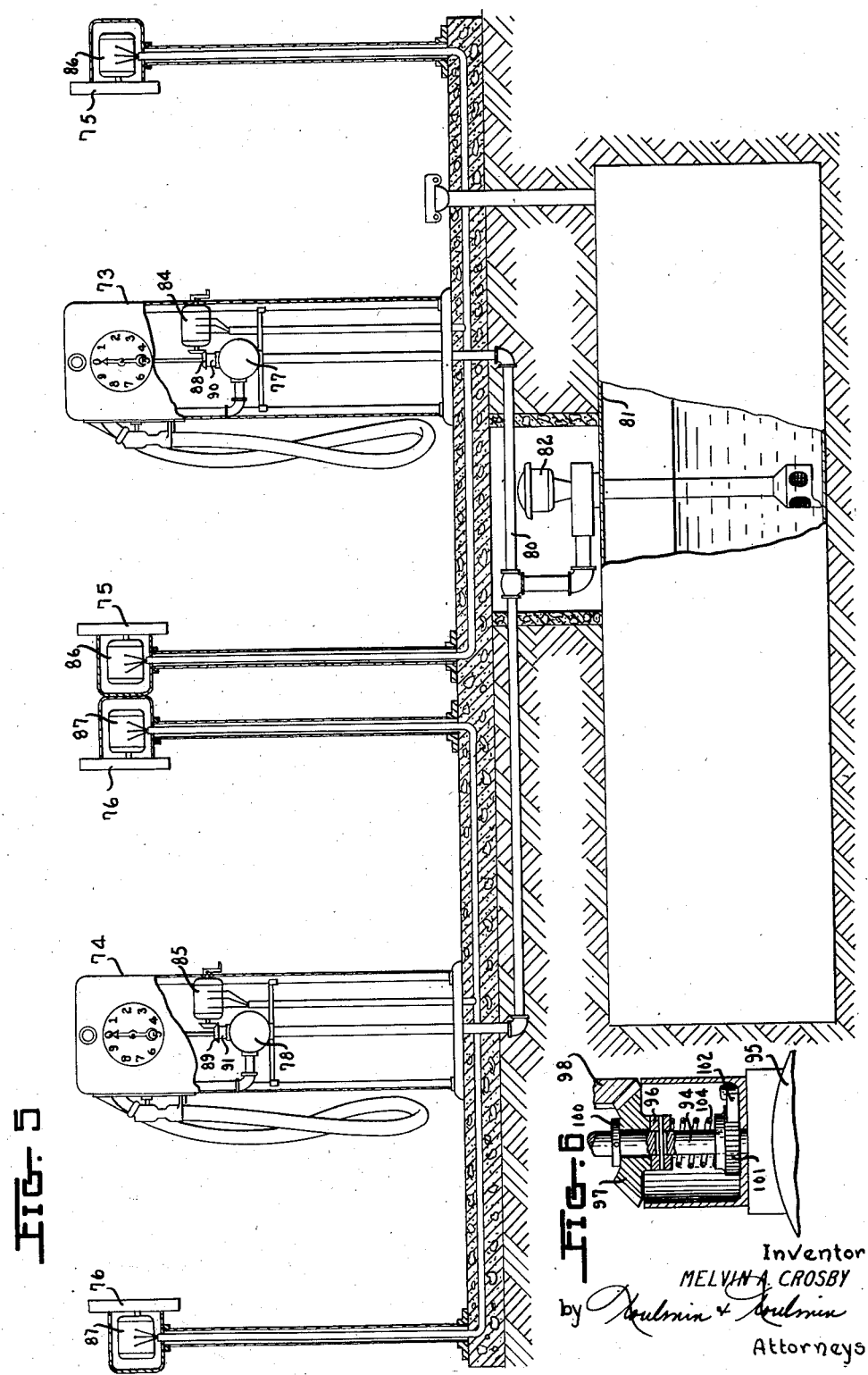

May 18, 1943. M. A. CROSBY 2,319,444
REMOTE INDICATOR FOR DISPENSING PUMPS
Filed Jan. 23, 1940 4 Sheets-Sheet 4
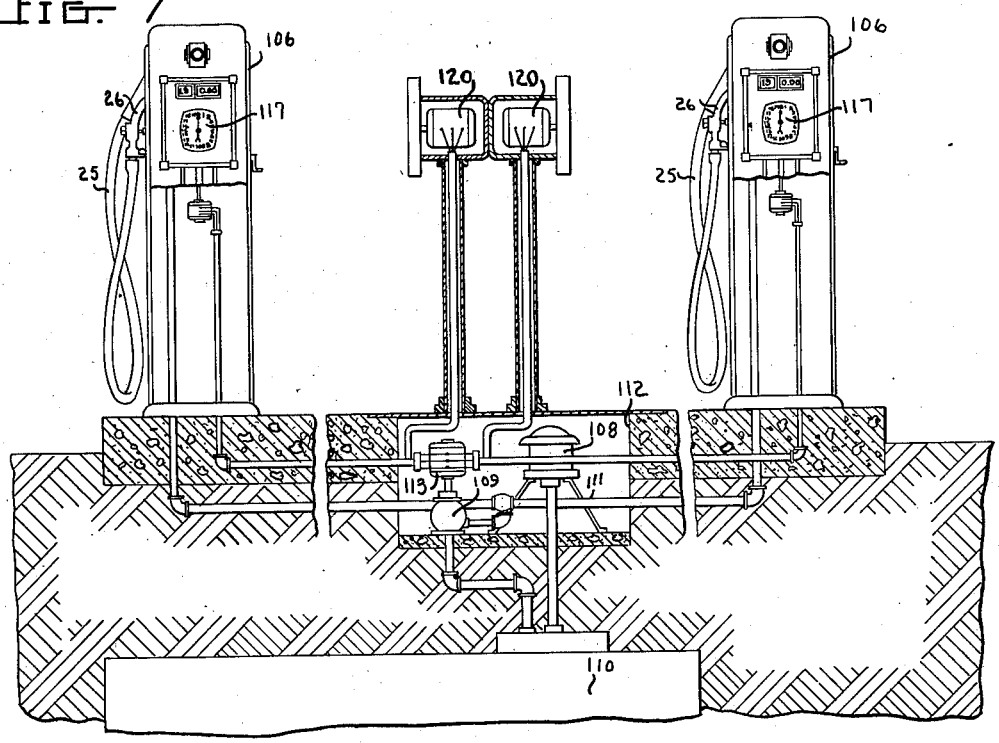
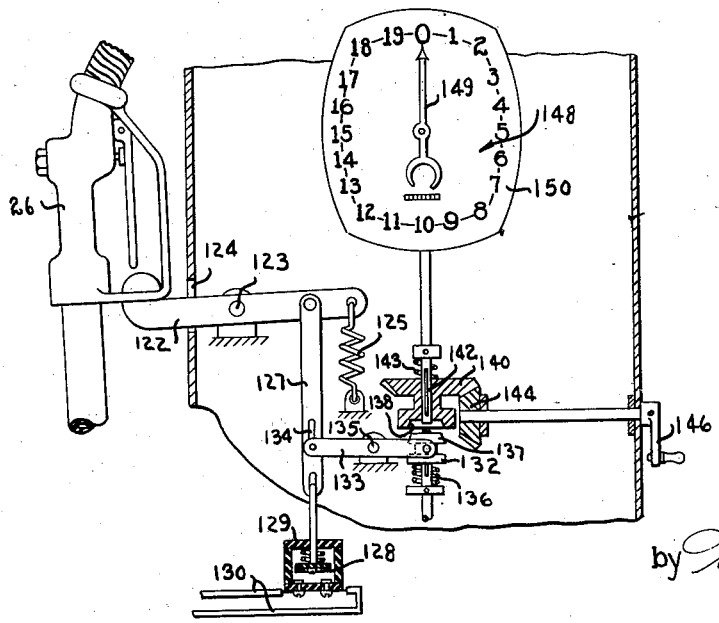
Inventor
MELVIN A. CROSBY
by
Attorneys Patented May 18, 1943

2,319,444

UNITED STATES PATENT OFFICE 2,319,444

REMOTE INDICATOR FOR DISPENSING PUMPS

Melvin A. Crosby, Dayton, Ohio, assignor to The Dayton Pump and Manufacturing Company, Dayton, Ohio, a corporation of Ohio Application January 23, 1940, Serial No. 315,227

4 Claims. (Cl. 221—95)

This invention relates to indicators for dispensing pumps and more particularly to remote indicators for liquid dispensing devices such as can be used for dealing out gasoline at service stations and the like.

It is an object of this invention to provide an improved indicator means which is remotely located from the dispensing pump and so connected and arranged that the quantity of gasoline or liquid fuel dispensed by the pump is accurately shown on the remote indicator.

Another object is to provide a liquid dispensing pump means utilizing a Selsyn or self-synchronizing motor generator system for accurately indicating the amount of fluid dealt out remotely from the dispensing apparatus.

Another object of this invention is to devise a gasoline dispensing system comprising remote indicators which are so positioned that the operator of the vehicle being serviced with fuel such as gasoline can readily observe the amount of gasoline dispensed into the storage tank of the vehicle without the necessity of getting out of the conveyance or being otherwise inconvenienced.

Another object is to provide an improved gasoline dispensing pump system of the character mentioned wherein the pump and meter mechanism of the system is placed under the ground with only the liquid dispensing means and indicator mechanism disposed above the ground.

These and other objects will appear from the following description taken in connection with the drawings, wherein:

Figure 3 is a schematic diagram showing the electrical connections of the Selsyn generator and remote indicator with the pump and hose nozzle release mechanism, the pump being shown partly in section;

Figure 4 is a plan view of a gasoline dispensing station illustrating the arrangement of pumps and remote indicator means for use for servicing a plurality of automobiles;

Figure 5 is a vertical cross sectional view, partly in elevation, showing the construction of the pumps and remote indicator system illustrated in Figure 4;

Figure 6 is a fragmentary detail sectional view of the friction clutch mechansm utilized for permitting the resetting of the indicator means to zero reading;

Figure 7 is an elevation view, partly in section, illustrating a gasoline dispensing station arrangement wherein two separate fluid dispensing units are supplied by a common pump and meter means disposed therebetween and provided with remote indicators;

Figure 8 is a fragmentary elevation view, partly in section, illustrating a modified combined clutch and electrical switch mechanism operable by removal and replacement of the hose nozzle on its support.

General arrangement

Figure 1:
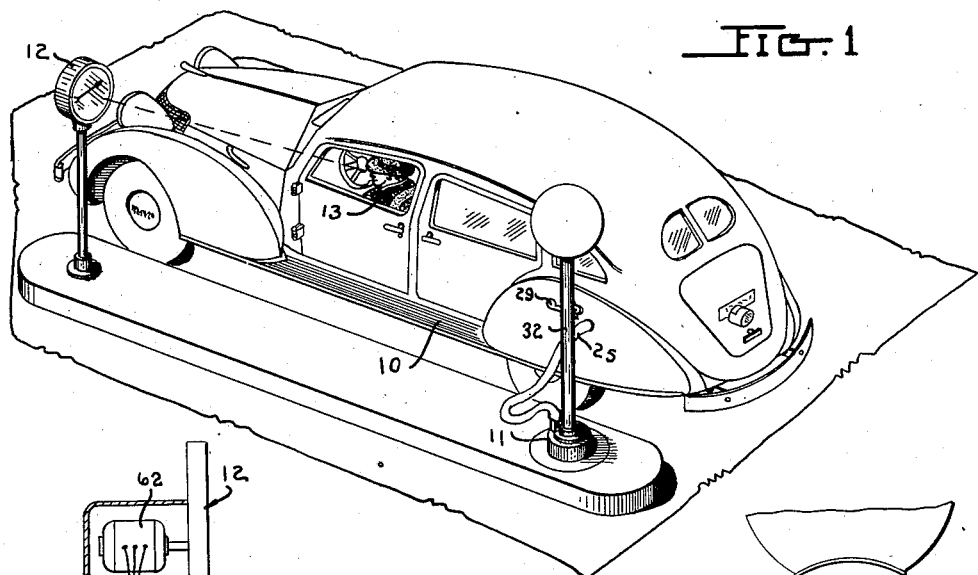
Figure 1 is a perspective view illustrating the servicing of an automobile at a service station utilizing the remote indicator system of this invention.

Referring to the drawings in detail, there is illustrated in Figure 1 an automobile designated 10 being serviced with gasoline from the dispensing pump, generally designated 11, at the rear of the car. The amount of gasoline dispensed is indicated by the indicator 12 which is suitably placed so as to be readily observed by the driver 13 of the automobile while seated in driving position. The remote indicator 12 is conveniently positioned forward from the dispensing pump unit 11 and can be viewed by the service man as well as the operator of the automobile. Preferably the remote indicator 12 is fixed as shown, but may if desired be arranged so as to be portable.

Dispensing apparatus unit

Figure 2:
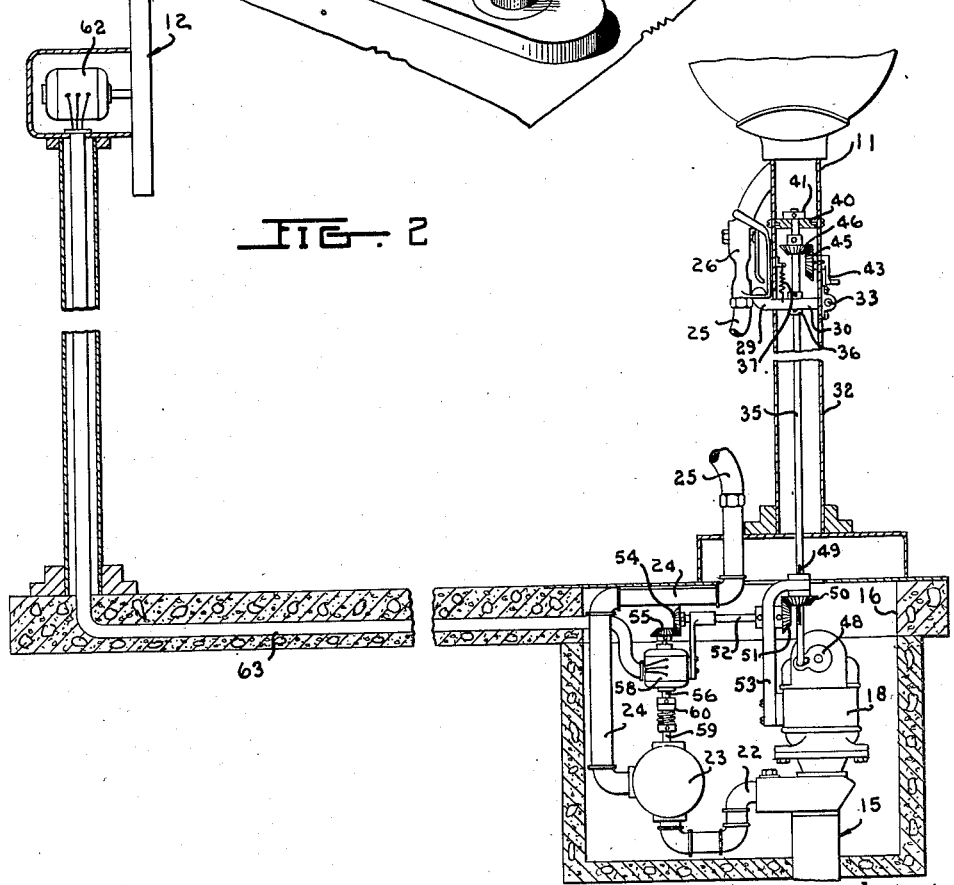
Figure 2 is a vertical sectional view through the dispensing pump and remote indicator arrangement illustrated in Figure 1.

The construction of the dispensing pump means and remote indicator mechanism is illustrated in Figures 2 and 3 and comprises a pumping unit generally designated 15. The construction of this type of pump which forms no part of this invention is disclosed and claimed in Letters Patent 2,149,602, granted March 7, 1939. The pump is installed through the opening of the top of an underground storage tank 16. Preferably a centrifugal pump is used, as illustrated in Figure 3. Use of a centrifugal pump eliminates priming and air separating devices. The impeller 17 of the centrifugal pump is disposed at the bottom within the storage tank, and is directly connected to the motor 18 by means of a shaft 19 and column 20. Motor 18 is mounted in a small, water-tight compartment which is located immediately above the underground storage tank 16.

As illustrated in Figures 2 and 3, operation of the pump forces fluid dispensed, such as gasoline, under pressure upward from the foot valve 21 at the bottom of the tank, out through the conduit 22, meter 23, pipe 24, hose 25 and nozzle 26 of the dispensing unit. The dispensing apparatus 11 is mounted on top of the ground and the hose nozzle 26 is supported, when not in use, on the hook 29 formed on the end of lever 30. This lever is pivotally mounted to the housing 32 of the dispensing apparatus 11, as shown at 33 in Figure 2. Centrally arranged in the housing 32 is a vertical shaft 35 which is operably connected to the hose support lever 30 as at 36 and is shifted axially by movement of the lever 30.

Upward movement of the lever 30 and shaft 35 is effected by means of the spring 37, when the hose nozzle 26 is removed from the hook 29. The weight of the hose 25 and attached nozzle 26 supported on the hook 29 normally maintains the lever 30 and shaft 35 in lowermost position against the tension of the spring 37. At the upper end of the shaft 35 the member 40 slidably supports the shaft, and a collar 41 adjustably mounted on the outer end of the shaft 35 maintains the shaft fixed to the member 40, as shown in Figure 2.

Crank means 43 is mounted on the pump unit adjacent the hose support 29 whereby the service attendant can return the indicating mechanism to zero reading. This is accomplished by turning the crank 43 so as to rotate the shaft 35 in reverse direction by means of the bevel gearing 45 and 46. When the hose nozzle 26 is resting on the hook 29, gears 45 and 46 are in mesh so that the shaft 35 can be rotated by the crank 43 to reset the indicator mechanism. Upon removing the hose from the hook the spring 37 raises the lever 30 and attached shaft 35 disengaging the bevel gears 45 and 46 preventing interference intentionally or otherwise with the operation of the indicator mechanism during dispensing of fluid.

The lower end of the shaft 35 is suitably arranged to actuate a snap switch 48 to start and stop the pump motor 18, as illustrated in Figure 2. Slidably fixed on the shaft 35 in the elongated keyway 49 is a bevel gear 50 which is in mesh with gear 51 fixed on the shaft 52. The bevel gears 50 and 51 are suitably supported by means of member 53 mounted on the housing of the motor 18. Rotation of the shaft 35 is effected during the dispensing operation by rotation of the bevel gear 51 which is driven through the bevel gears 54 and 55. The latter gear is keyed to the armature shaft 56 of the Selsyn generator 58 and is driven by the shaft 59 of the fluid meter 23 upon flow of gasoline through the meter.

A friction clutch means 60 is arranged between the shafts 56 and 59 to permit reverse rotation of the generator armature shaft 56 and resetting of the indicator mechanism to zero reading. In Figure 3 a modified clutch means 61 is illustrated wherein suitable leverage means is used for co-acting with the hose nozzle support lever 30 to engage or disengage the clutch.

*Remote indicator mechanism*

The indicator mechanism comprises a Selsyn motor-generator system which provides a simple and accurate means for transmitting indications to remote positions. In the arrangement illustrated in Figures 2 and 3 the Selsyn generator 58 is electrically connected to the Selsyn motor 62 of the remote indicator 12 through electrical connections made through the conduit 63. The Selsyn motor 62 and Selsyn generator 58 are electrically connected similar to three-phase induction motors, but have shuttle-wound rotors $S_1$ and $S_2$, respectively, with definite poles whose windings are connected to a single-phase alternating current source R, as shown in the diagrammatic illustration of Figure 3. Movement of the rotor $S_1$ of the generator brings about a similar movement of the rotor $S_2$ of the motor since the rotor armatures of the generator and motor are synchronously connected.

In the modification shown in Figures 4 and 5, provision is made to service one or more automobiles such as indicated at 70 and 71 in Figure 4 and wherein the dispensing pump units 73 and 74 are provided with remote indicators 75 and 76, respectively. In this instance the meters 77 and 78 of the dispensing units are supplied with fluid through the common conduit 80 which is supplied with gasoline pumped from the storage tank 81 by the pumping unit 82 as shown in Figure 5. This pumping unit is preferably a centrifugal pump similar to that illustrated in Figure 3. The remote indicator means 75 and 76 are operated by means of the Selsyn generators 84 and 85 which are electrically connected to the respective remote motors 86 and 87 of the remote indicators 75 and 76. The Selsyn generators 84 and 85 are connected through the respective bevel gearing 88 and 89 so as to be mechanically driven by the meter shaft means 90 and 91, respectively. In this construction a friction clutch is also provided between the meter shafts 90 and 91 and bevel gearing 88 and 89 so as to permit resetting of the indicator mechanism.

*Friction clutch construction*

The friction clutch mechanism is preferably constructed as illustrated in Figure 6, wherein the meter shaft generally designated 94 driven by the fluid meter generally designated 95 is provided with friction disc drive means 96 for rotating the bevel gear 97 loosely mounted on the upper end of the shaft 94. Bevel gear 97 meshes with the bevel gear 98 which rotates the rotor armature of the generator in the Selsyn indicator system, and the gear 97 is suitably retained on the shaft by means of the collar 100. A ratchet and pawl means 101 and 102 are arranged on the meter shaft 94 so as to permit rotation of the shaft in only one direction. The friction discs 96 are urged together by means of the spring 104 which is suitably disposed around the shaft 94 and rests on the top of the ratchet wheel 101. Tension in the spring 104 is such that the operator is able to rotate bevel gearing 97 and 98 by turning the resetting crank 43, but backward rotation of the meter shaft 94 is prevented by the ratchet and pawl mechanisms 101 and 102. In this way the remote indicators as well as the indicators on the dispensing unit may be reset to zero after using the dispensing units.

Figure 7 illustrates another modified arrangement wherein there is illustrated a gasoline dispensing station provided with two separate fluid dispensing units 106 which utilize a common pump and meter means 108 and 109, respectively. Fluid being dealt out is pumped from an underground storage fluid container 110 through the meter 109 into the common pipe line 111 which is connected to the hose 25 and nozzles 26 of the dispensing units 106. In this construction the common pump and meter means, as well as all the mechanically operated mechanism, is suitably mounted in a pit 112 above the storage tank 110. A Selsyn generator 113 is electrically connected to the Selsyn motors 116 positioned in the dispensing units 106 which drive the indicator mechanism 117 of the dispensing units. Electrically connected to the Selsyn generator 113 are the remote control motor indicator means 120 which are similarly driven as the indicator means 116 disposed in the dispensing units so as to provide remote indicators for showing the amount of fluid dispensed from the dispensing units 106.

In Figure 8 a modified friction clutch, resetting means and nozzle control mechanism are illustrated which are preferably used in the pumping unit construction illustrated in Figure 7. In this construction the hose nozzle 26 is arranged to be rested on the outer end of the lever 122 which is pivoted in the upper part of the dispensing unit as illustrated at 123 and is adapted to move vertically in the slot 124. Spring means 125 is arranged to urge the lever 122 to move in a clockwise direction about the pivot 123 and there is attached adjacent the spring a rod means 127 connected to operate the electric switch 128 disposed in the waterproof box 129.

Suitable leads 130 are connected through the switch to the motor pumping unit. For operating the clutch means 132 there is provided a lever 133 which is fastened to the rod 127 and adapted to reciprocate in the slot 134. The lever 133 is pivoted as at 135 and is adapted upon downward movement of the rod 127 to permit spring 136 to engage the cone shaped friction clutch means 137 with the opposed friction cone means 138.

Integral with the friction clutch means 138 is the bevel gear 140 which members are keyed to the shaft 142 and are slidably mounted thereon so as to be moved vertically against the spring means 143 to disengage from the bevel gear 144 fixed on the shaft fastened to the resetting crank means 146. When the hose nozzle 126 is removed from the outer end of the lever 122 spring 125 rotates the lever about its pivot 123 and moves the rod 127 downward to close the electrical switch 128 and start the pumping motor. Simultaneously the lever 133 is permitted to swing about its pivot 135 to permit engagement of the clutch cone disc 137 with the member 138 forcing the gear 140 out of engagement with the resetting bevel gear 144, thereby disengaging the resetting mechanism. It will be understood that the spring 136 will be of sufficient strength to overcome the pressure of spring 143. The rotation of the shaft 142 actuates the indicator mechanism 148 and moves the indicator hand 149 over the dial 150. At the same time the remote indicators are operated through the Selsyn motor connections.

The remote indicator mechanism of this invention is adapted to be used with price computing liquid dispensing pumps, as illustrated in Figure 7, as well as in non-computing dispensing units.

The operation of the dispensing units and remote indicators will be readily understood from the above description and further explanation is deemed unnecessary.

It will be understood that this invention is not limited to the particular details of construction illustrated and described and that various modifications and changes may be made as required under different conditions and uses without departing from the spirit of this invention.

Having thus fully described my invention, what I claim as new and desire to secure by Letters Patent is:

1. In a fluid dispensing mechanism including a motor driven pump, electrical switch means for controlling the operation of said motor, a meter, indicator means and resetting means therefor, the combination with a movable fluid dispensing conduit member of means comprising a pivoted lever for supporting said conduit member, said pivoted lever being operable by removal of said conduit from said supporting means to swing about its pivot and drivingly connect said indicator mechanism with said meter whereby the indicator is actuated in response to the liquid passed through said meter, said pivoted lever having means operatively connected thereto and shiftable to disconnect said resetting mechanism and close said electrical switch to start said motor driven pump immediately upon removal of said fluid conduit member from said support, and last mentioned means comprising a rod and clutch shifting member, said member being operatively connected to said rod and operable to engage and disengage the clutch to operatively connect the meter to the indicating mechanism.

2. In a liquid dispensing system, liquid dispensing means, a pump connected therewith for supplying fluid under pressure to said dispensing means, a meter, indicator means operatively connected to said meter for registering the amount of liquid dispensed, a motor for driving said pump, electrical switch control means for initiating the operation of said motor to operate said pump, said dispensing means comprising a movable hose and nozzle means connected to said meter, means comprising a reciprocable lever for supporting said hose, means comprising an axially shiftable rod operatively connected to said reciprocable lever whereby upon the removal of said hose and nozzle from the support electrical switch connection is made for starting the operation of said pump, and additional means comprising a pivoted lever operatively connected through said shiftable rod to said hose support means for clutching and declutching said indicator means to operatively connect said meter means during the operation of said dispensing system and render the same inoperative upon the return of said hose to its support.

3. In a liquid dispensing system, a tank for storing liquid underground, a pit arranged thereabove, liquid flow establishing means arranged in said pit and connected with said storage tank and adapted to withdraw liquid therefrom, liquid meter means disposed in said pit and connected to the outlet side of said flow establishing means, an indicator associated with said meter means, means comprising a delivery hose and nozzle arranged to be supported above the ground and adjacent said pit through which liquid is dispensed, a yieldable support for said hose and nozzle, indicator mechanism comprising a Selsyn motor generator means arranged in said pit and operatively connected to said meter for indicating the amount of fluid dispensed through said delivery means, said indicator mechanism comprising means for displaying the amount of fluid dispensed at a position remote from said delivery means, a single means for returning both said indicator mechanisms to initial or zero position, and means operated by said yieldable support for automatically rendering said indicator return mechanism inoperative when the nozzle is removed from said support.

4. In a liquid dispensing system, a tank for storing liquid, liquid flow establishing means and a delivery hose and nozzle operatively connected with said tank for withdrawing liquid therefrom and dispensing it through said delivery hose and nozzle, means comprising a liquid meter connected to said flow establishing means and said delivery hose means, and an indicator connected with said meter, means comprising a generator driven by said meter and a remotely located motor operated thereby, an indicator associated with said motor for accurately indicating the amount of liquid dispensed through said delivery hose and nozzle, interlocking means operable from a single point for simultaneously returning both of said indicators to initial or zero position, and a pivoted lever for supporting said nozzle and connections from said lever constructed and arranged to unlock said interlocking means when the nozzle is removed from said lever to thereby render said indicator returning means inoperative.

MELVIN A. CROSBY.